No. 797,419. PATENTED AUG. 15, 1905.
E. C. FALES.
BLUING DEVICE.
APPLICATION FILED NOV. 10, 1904.
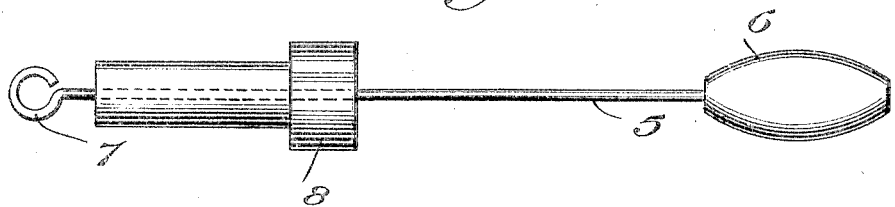
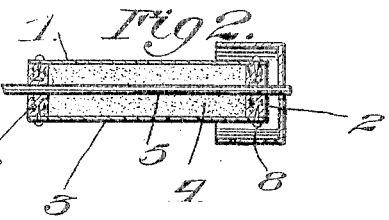
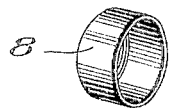
Witnesses
Phil E. Barnes.
C. C. Hines.
Inventor
Ellis C. Fales.
By Victor J. Evans
Attorney

UNITED STATES PATENT OFFICE.

ELLIS C. FALES, OF FOXBORO, MASSACHUSETTS.

BLUING DEVICE.

No. 797,419.     Specification of Letters Patent.     Patented Aug. 15, 1905.

Application filed November 10, 1904. Serial No. 232,209.

*To all whom it may concern:*

Be it known that I, ELLIS C. FALES, a citizen of the United States, residing at Foxboro, in the county of Norfolk and State of Massachusetts, have invented new and useful Improvements in Bluing Devices, of which the following is a specification.

This invention relates to bluing devices adapted for use in bluing rinsing-water in the process of washing clothes, the object of the invention being to provide a device of this character which possesses superior advantages in point of simplicity of construction, economy of production, convenience of manipulation in use, and capability of being handled without liability of the hands or clothes of the operator or surrounding objects being soiled or discolored by the bluing material.

With this and other objects in view the invention consists of the features of construction, combination, and arrangement of parts hereinafter fully described and claimed, reference being had to the accompanying drawings, in which—

Figure 1 is an elevation of a bluing device embodying the invention. Fig. 2 is a partial longitudinal vertical section of the same, and Fig. 3 is detail view of the drip-cup.

The device embodies a color-receptacle 1, comprising opposite end heads 2 and a suitable envelop or inclosure 3, extending between said heads and suitably secured thereto and forming a cylindrical casing for the coloring material 4, which may be of solid or granular form, as desired. The inclosure 3 may be of any suitable material adapted to permit access of water to the coloring material, but is preferably formed of fabric and of a character to permit ready access of water thereto and the filtering of the bluing substance therethrough.

Extending through the heads 2 is a stem 5, which is provided at its lower end with a suitable handle 6, by which the bluing device may be readily and conveniently manipulated, and is formed at its upper or opposite end with an eye or analogous suspending member 7, so that the bluing device may when not in use be suspended from a nail or other suitable support. That portion of the stem which projects through the receptacle 1 supports the heads 2 and maintains them in their proper relation and at the same time prevents collapsing of the receptacle after it becomes wet, and the volume of the coloring material is reduced by gradual absorption during the process of coloring the rinsing-water. That end of the stem which carries the handle 6 is preferably longer than the opposite end carrying the suspending member 7, so as to dispose the handle a suitable distance away from the receptacle to allow the latter to be submerged in the rinsing-water without wetting the hand of the operator.

On the stem 5 is disposed a drip-cup 8, said cup being located between the handle 6 and the contiguous end of the receptacle 1 and having its open end facing the lower end of the said receptacle, so as to receive the colored water dripping therefrom when the device is withdrawn from the water and suspended. The bottom of the cup is provided with an opening for the passage of the stem 5, to which it is suitably secured, a liquid-tight connection being provided between the same to prevent the drip from trickling down the stem and discoloring and dripping from the handle 6. This cup receives or is disposed slightly below the lower end of the receptacle 1 in order to catch the drip from the same in an effectual manner and prevent the same from soiling or discoloring the hands or clothes of the operator or surrounding objects.

The operation of the device will be readily understood, and it will be seen that it may be conveniently handled and after use may be suspended by the member 7 from any suitable support. Its simplicity of construction enables it to be manufactured in a convenient manner and at a small cost.

From the foregoing description, taken in connection with the accompanying drawings, the construction and mode of operation of the invention will be apparent without a further extended description.

Changes in the form, proportions, and minor details of construction may be made within the scope of the invention without departing from the spirit or sacrificing any of the advantages thereof.

Having thus described the invention, what is claimed as new is—

A bluing device comprising a receptacle, a stem extending through the receptacle and provided at one end with a handle and at the other end with a suspending member, and a drip-cup disposed upon the stem adjacent the lower end of the receptacle.

In testimony whereof I affix my signature in presence of two witnesses.

ELLIS C. FALES.

Witnesses:
    BERT W. COLEMAN,
    JOHN R. FALES.